No. 845,778. PATENTED MAR. 5, 1907.
A. C. HACHFIELD.
BALL BEARING.
APPLICATION FILED AUG. 29, 1904.

WITNESSES

INVENTOR
August C. Hachfield
BY
ATTORNEYS

UNITED STATES PATENT OFFICE.

AUGUST C. HACHFIELD, OF MILWAUKEE, WISCONSIN.

BALL-BEARING

No. 845,778.            Specification of Letters Patent.            Patented March 5, 1907.

Application filed August 29, 1904. Serial No. 222,499.

*To all whom it may concern:*

Be it known that I, AUGUST C. HACHFIELD, a citizen of the United States, residing at Milwaukee, county of Milwaukee, and State of Wisconsin, have invented new and useful Improvements in Ball-Bearings, of which the following is a specification.

My invention relates to improvements in ball-bearings.

Ball-bearings have heretofore been generally regarded as available only for light loads, as the amount of load to be carried by one set of balls is necessarily limited, and the use of more than two sets of balls in a single bearing has heretofore been regarded as impractical, owing to the fact that slight variations in either the balls or their races are invariably found to exist either in the bearing as originally constructed or after a period of use. Where such variations exist in any ordinary form of bearing, the load is thrown upon the two balls or sets of balls which are relatively highest in the series, and the strength of the bearing is therefore limited to the capacity of two sets of balls to sustain it.

The object of this invention is to provide a form of structure in which a single bearing may be formed with a plurality of ball-retaining sleeves arranged in sets, each set having two sets of balls and having one sleeve of each set arranged to receive its portion of the load between the planes of the sets of balls pertaining thereto, that portion of the sleeve which is concentric with the balls being free to yield sufficiently to cause a distribution of the load to the balls of both sets. In designing such a bearing I have also aimed to provide a structure having but few parts and which requires a minimum amount of machine-work and labor in assembling the parts and in which each set of sleeves and their contained balls may be removed and replaced as an individual unit.

In the following description reference is had to the accompanying drawings, in which—

Figure 1 is a sectional view of my invention drawn on a plane cutting the axis of the bearing shaft or axle. Fig. 2 is a sectional view drawn on line $x\ x$ of Fig. 1. Fig. 3 shows a pair of modified sleeves in section.

Like parts are identified by the same reference characters throughout the several views.

In the drawings my invention is shown embodied in an axle-bearing.

1 is the axle-shaft of a vehicle, and 2 is a bearing-box, which in this case also constitutes the wheel-hub, a portion of the spokes 3 being also shown.

4 is an outer end cap, and 5 is a dust-excluding nut screwed to the inner end of the sleeve and covering a series of annular ribs or dust-excluding flanges 6 on the axle-shaft.

The inner surface of the box 2 is provided with annular shoulders 8, preferably rounded concavely, as shown, and each adapted to receive a radially-extending convex shoulder 9 on the ball-inclosing bearing-sleeve 10. The outer surface of the sleeve 10 is so formed that all portions thereof except the shoulder 9 are out of contact with the box, and as the shoulder 9 is located substantially at the center of the sleeve it is obvious that the sleeve is permitted to rock or tilt longitudinally within the box 2. The interior walls of the sleeves are preferably smooth-surfaced and arranged to converge conically toward the center of the box 2.

The interior sleeve 12 of the inner set is formed to fit a concavely-rounded shoulder 13, against which it abuts when in position. This sleeve is provided with two ball-race channels 14 and 15, respectively, which are preferably V-shaped in cross-section and arranged for a two-point contact with the balls 11. The interior sleeve 16 of the outer set is located upon a reduced end portion of the axle-shaft beyond the shoulder 17, the shaft being screw-threaded at 18 and provided with a nut 19, against which the sleeve 16 abuts, as shown. This sleeve is also provided with ball-race channels 20 and 21, respectively, which are similar in form to the channels 14 and 15. The channels 14 and 15, 20 and 21 are located near the ends of the sleeves, respectively, and the balls therefore contact with the inclosing sleeves 10 on opposite sides of the plane of the shoulder 9 in each case. As the ends of the sleeves 10 in the planes of the balls are out of contact with the inclosing box, they are permitted to tilt slightly, and thus distribute the load to both sets of balls, notwithstanding slight variations in their size or in the races, which would otherwise throw the entire strain upon the balls of one set. The material of which the sleeves 10 are composed will also be permitted to yield slightly if the pressure becomes excessive at any one point in the bearing, thus relieving the pressure upon the ball at that point. 25 are ball-retaining rings fitted to suitable channels in the ball-inclosing sleeves 10 at their exterior ends, and 26 is a nut screwed upon the end of the axle-shaft to hold the outer set of sleeves in position.

It will be observed that the sleeves 12 and 16 are tapered toward the center of the box in correspondence with the tapering or conical interior surfaces of the outer sleeves 10. The end race-channels 15 and 21 are therefore larger in diameter than the intermediate channels 14 and 20 and have a correspondingly greater number of balls. This gives to each set of sleeves a conical pitch toward the center of the hub, which is, however, balanced by the pitch of the opposing sleeves in the opposite direction.

A bearing constructed as above described can be accurately formed with a minimum amount of machine-work, and each set of sleeves with the contained balls may be assembled and handled as an individual unit. When assembled in the bearing, the load will be distributed with substantial uniformity to the balls of each set.

While I have shown and described the outer sleeve in rocker-bearing contact with the box, it is obvious that the same result might be obtained by permitting the interior sleeve to rock, and I do not, therefore, limit the scope of my invention to a specific application of this principle to either one of the sleeves as distinguished from the other, although some of my claims are limited by expressly including an outer sleeve in rocker bearing with the hub, this being the preferred form of construction in the class of bearings illustrated.

I am aware that ball-retaining sleeves have heretofore been constructed with curved outer surfaces; but in order to accomplish the object of my invention it is necessary that the line of pressure of the ball upon such a sleeve shall cut the space between the tapered end of the sleeve over the ball and the inclosing box of the hub.

In the above-described construction the normal line of pressure of each ball on the outer sleeve is in the plane of an annular row or series of balls. With a two-point bearing on the inner sleeve the load is normally supported on the balls in a line at right angles to the axle, and the same would of course be true in a one-point bearing on the inner sleeve if the sleeve were cylindrical at the point of contact. It will be observed, however, that the construction of the sleeves is such that even during an end thrust where the load is thrown upon one side or the other of the race-channels in the inner sleeve the line of pressure extending through the two points of ball-contact with the respective inner and outer sleeves will still extend through the space between the outer sleeve and the inclosing hub-box 2 on the same side of the rocker-bearing point as that occupied by the ball. The sleeve will therefore adjust itself to compensate for inequality in the balls and distribute the load upon all the balls equally under all conditions.

In Fig. 3 I have illustrated a modified construction of the bearing-sleeves in which the outer sleeve 25' is provided with an interior wall or bearing-face which tapers inwardly from both ends, as shown at $a$ and $b$, and the inner sleeve is formed in two sections 26' and 27, screwed together and adapted to receive spacing-washers at 28. The sleeve in this construction is made in sections to facilitate the insertion of the balls in the race-channels. It will also be observed that the box 30 is also modified, the central bearing of the outer sleeve being secured by providing the sleeve with a radially-extending rib 31, fitting a channel formed in the box between the shoulder 32 and a thimble 33, which is made removable to permit the insertion and removal of the sleeve 25.

Having thus described my invention, what I claim as new, and desire to secure by Letters Patent, is—

1. In a bearing, the combination with the opposing concentric walls of a bearing-shaft and box, of a plurality of sets of concentric sleeves interposed between said walls; and balls arranged between the outer end portions of each set of sleeves in a plurality of sets; one of the sleeves in each set being arranged in central rocker-bearing contact with one of said walls between the planes of the sets of balls, and having its end portions out of contact therewith in the lines of ball-pressure and in the planes of the sets of balls; said rocker-bearing sleeves being free to tilt longitudinally and said balls being sufficiently loose to permit a slight tilting movement.

2. In a bearing, the combination with the opposing concentric walls of a bearing-shaft and box, of a plurality of sets of concentric sleeves interposed between said walls; and balls arranged between the sleeves of each set in a plurality of sets and in contact with bearing-surfaces on the respective sleeves; one of the sleeves of each set being arranged in central rocker-bearing contact with one of said walls between the planes of the sets of balls, and having its end portions out of contact therewith, in the lines of ball-pressure and in the planes of the sets of balls; said rocker-bearing sleeves being free to tilt longitudinally and said balls being sufficiently loose to permit a slight tilting movement.

3. In a bearing, the combination with a bearing-shaft and box, of a plurality of sets of concentric bearing-sleeves, interposed between the shaft and box; the outer sleeve of each set being arranged in central rocker-bearing contact with the box, and the inner sleeve of each set being provided with race-channels concentric with the outer end portions of the outer sleeve; balls mounted in said race-channels and loosely supporting the outer sleeves in planes cutting such sleeves on both sides of the rocker-bearing points; said sleeves being out of contact with the box in such planes, and in the lines of ball-pressure.

4. In a bearing, the combination with a bearing-shaft and box, of a plurality of sets of concentric bearing-sleeves interposed between the shaft and box; balls arranged between said sleeves in a plurality of sets, with the balls of one set in each set of sleeves traversing a path of greater diameter than those of the other set; one sleeve in each set being arranged in central contact with the box, between the planes of the sets of balls and out of contact therewith in the end portions.

5. In a bearing, a bearing-shaft; an inclosing box therefor, provided with interior shoulders; a pair of bearing sleeves, each adapted to be longitudinally inserted in the end of the box, and centrally fitted to the side face of one of the shoulders, with ends diverging from the box at each side of the shoulder; each of said sleeves being provided with a conical inner surface; and a set of balls inclosed by each end portion of each sleeve; said balls and sleeves being so arranged that the lines of pressure between the inner and outer contact-points, will, if extended, cut those portions of the sleeves which are out of contact with the inclosing box.

6. In a bearing, a bearing-shaft; an inclosing box therefor, provided with an inwardly-projecting shoulder near each end, having a rounded face on the side toward the adjacent end of the box; a bearing-sleeve in each end portion of the box having a central portion in contact with the rounded face of the corresponding shoulder; and a set of balls inclosed by each end portion of each bearing-sleeve.

7. In a bearing, the combination with the opposing concentric walls of a bearing-shaft and box; of a pair of sleeves interposed between said walls; balls arranged between said sleeves in a plurality of sets; one of said sleeves being arranged in substantially central contact with one of said walls between the planes of the sets of balls and having its end portion out of contact with said walls; one of said sleeves being provided with a conical inner surface crossing the planes of both sets of balls, contacting with the balls in planes of pressure which cut through the end portions of the sleeve and the spaces between such sleeve and the wall with which it is in central contact; the other of said sleeves being provided with race-channels, each arranged for a two-point contact with the balls of the corresponding set.

8. In a bearing, the combination with the opposing concentric walls of a bearing-shaft and box, of two sets of sleeves interposed between said walls, with one sleeve in each set having a conically-tapered bearing-surface crossing the planes of both sets of balls; and another sleeve in each set being provided with ball-race channels; and a set of balls at different distances from the axial central line mounted in each of said race-channels and interposed between the sleeves.

In testimony whereof I affix my signature in the presence of two witnesses.

AUGUST C. HACHFIELD.

Witnesses:
 JAS. B. ERWIN,
 LEVERETT C. WHEELER.